July 4, 1939.  W. S. WILSON ET AL  2,165,187
MANUFACTURE OF SODIUM ALUMINATE
Filed Dec. 26, 1935   2 Sheets-Sheet 1
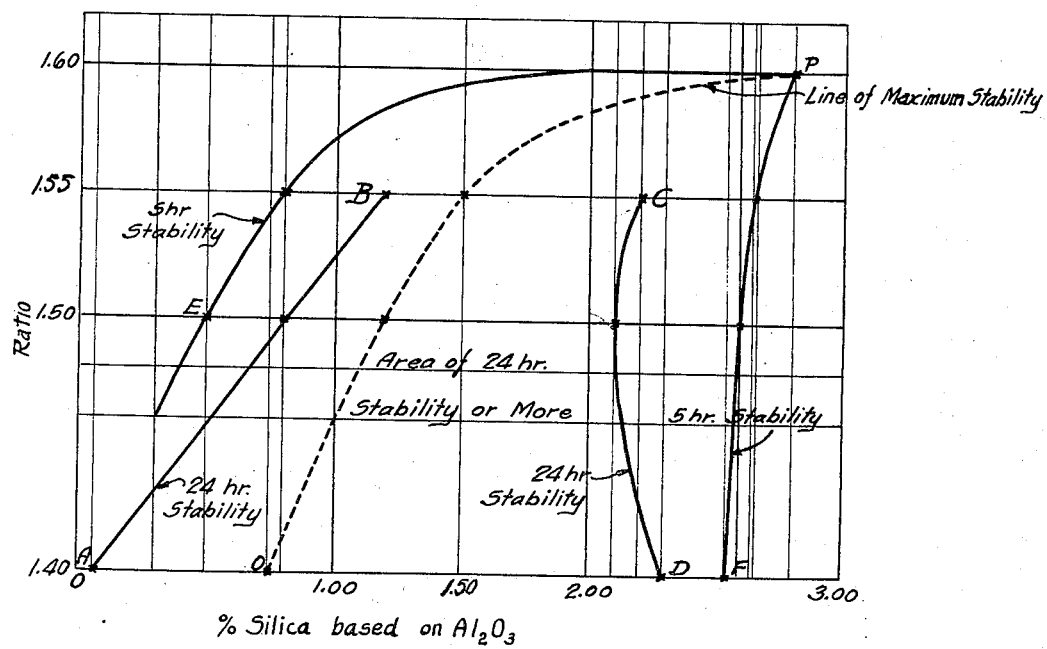

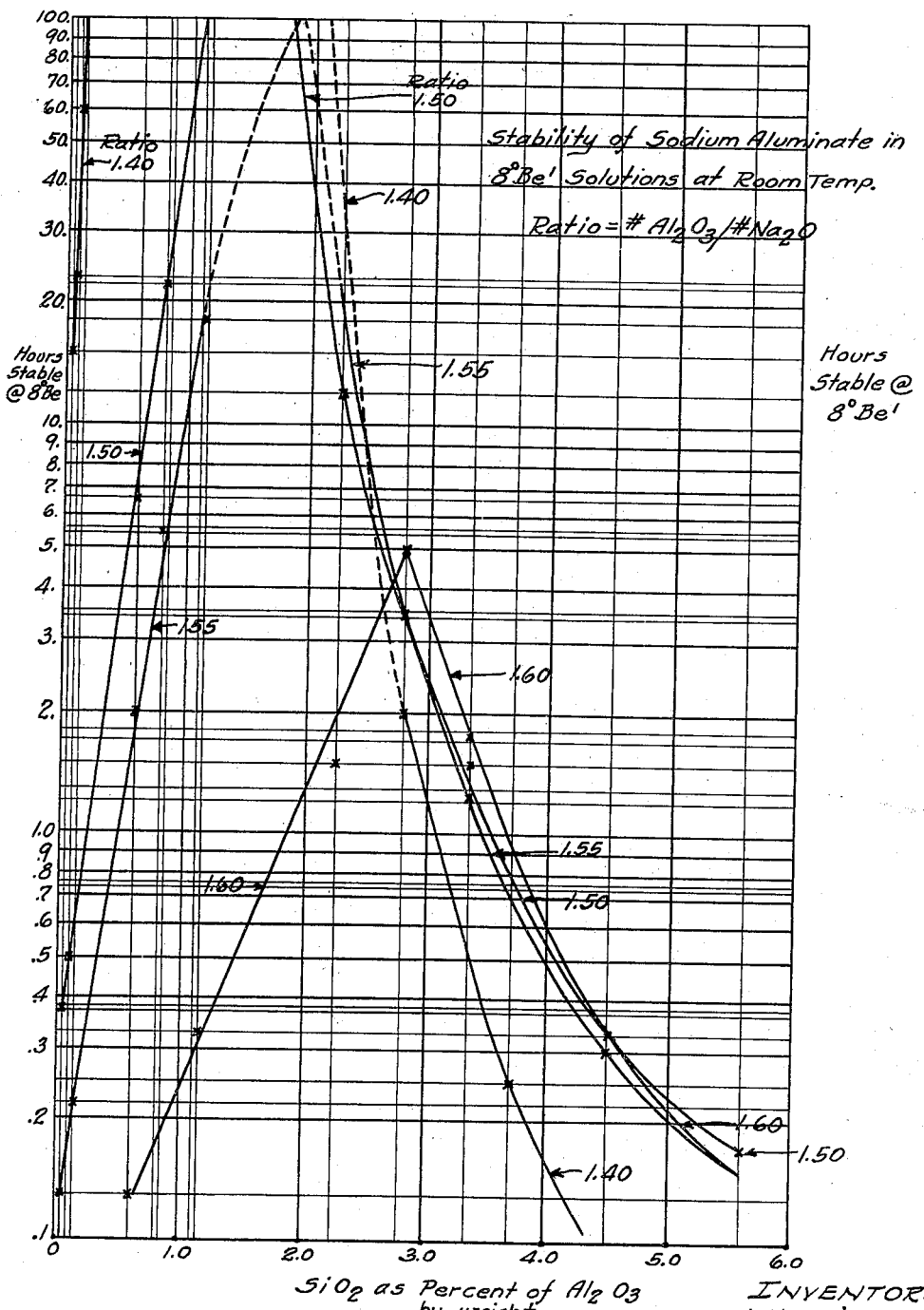

Patented July 4, 1939

2,165,187

UNITED STATES PATENT OFFICE 2,165,187

MANUFACTURE OF SODIUM ALUMINATE

William S. Wilson, Boston, and Alban J. Lobdell, Jr., Woburn, Mass., assignors, by direct and mesne assignments, to Monsanto Chemical Company, a corporation of Delaware Application December 26, 1935, Serial No. 56,184

11 Claims. (Cl. 23—52)

This invention relates to the manufacture of sodium aluminate and it has particular application to the preparation of a sodium aluminate product which is relatively stable when dissolved in water. The present application is a continuation in part of our copending application filed December 7, 1932, Serial No. 646,152.

Sodium aluminate is made commercially by fluxing bauxite with soda ash or dissolving it in caustic soda. It is recognized that one of the objections to the use of sodium aluminate for many purposes such as the manufacture of paper, clarification of water and the like, resides in the fact that an aqueous solution of commercial sodium aluminate suitable for the intended uses is unstable, in that a precipitate of indefinite composition is formed on standing.

Organic matter is known to stabilize sodium aluminate solutions in some measure. It has for example, been proposed to attain stability by addition of sugar. However, organic matter is frequently objectionable and furthermore, it tends to decompose on standing so that uniform results are not obtainable with it. It is also recognized that this tendency of aqueous solutions of sodium aluminate to precipitate during storage may be retarded or prevented by the presence of a large excess of caustic soda over that theoretically required to produce sodium aluminate ($Na_2O-Al_2O_3$). U. S. Patent 1,604,124 describes commercial sodium aluminate as a product containing 18% sodium aluminate, 9% $Na_2CO_3$ and 6% NaOH. The total $Al_2O_3$ in this composition is 11.2%. The total $Na_2O$ is 17.3%, therefore the ratio of alumina to $Na_2O$ is .65. According to the disclosure of the patent this solution is made stable by incorporation of 10% of additional caustic. In such product the alumina and $Na_2O$ are in the ratio of 11.2 to 27.3 or .41. The theoretical ratio in sodium aluminate is 1.65. Obviously the patented product is low in alumina which is the active agent in clarification processes. It is desirable therefore to increase the proportion of alumina insofar as possible.

Until comparatively recently, the main commercial use for sodium aluminate was in the Bayer process for refining bauxite for use in the manufacture of metallic aluminum. The unstable character of aqueous sodium aluminate is essential to the success of that process since, the more complete the hydrolysis of sodium aluminate to caustic soda and aluminum hydrate, the greater the yield of the desired product. As a result, the impression seems to have spread quite generally that in the absence of a large excess of caustic soda, sodium aluminate ($NaAlO_2$) solutions are necessarily unstable. Moreover, all of the products on the market which have come to our attention, when dissolved in water, display the characteristic precipitate formation within a short time.

By the known processes of preparing commercial sodium aluminate from bauxite, products are usually obtained in which the $Al_2O_3-Na_2O$ ratio is as high as 1.4 or 1.5 but such products give water solutions of poor stability. In applicants' copending application Serial No. 646,152, filed December 7, 1932, there is disclosed a process of stabilizing solutions of this type involving the adjustment of the silica content to a predetermined range.

It is the object of the present invention to provide a sodium aluminate product as well as a method of preparing the same, from a natural or refined grade of bauxite, the aqueous solution of which is relatively stable and has but little excess caustic soda. This object is attained by adjustment of the percentage of silica in the product in relation to the alumina-caustic ratio either by addition of silica to the sodium aluminate to make up for a deficiency or by removal of silica in event of an excess due to silica present in the bauxite. The percentage of silica required to obtain stability is a variable, increasing with increase in percentage of alumina with respect to caustic but being at an optimum over a comparatively narrow range at any given ratio. This optimum range becomes highly critical as the theoretical ratio of alumina to caustic is approached.

Various factors affect the quality of the product, including the temperature of the reaction, the quantity of unreacted or undissolved alumina present in the product, the presence of organic matter, inorganic chlorides and carbonates, the ratio of alumina to caustic, as well as other factors.

Commercial bauxite which contains a substantial quantity of silica, reacts with the caustic forming a silicate, in much the same way that alumina reacts with caustic soda. Heretofore, it has been customary to form the aluminate by reacting the bauxite with caustic soda or soda ash and thereafter to separate a clear aqueous solution of aluminate and finally to evaporate the solution to dryness. The product so obtained is satisfactory for many uses to which sodium aluminate is put, notwithstanding the fact that it may contain substantial amounts of soluble $SiO_2$ in the form of silicates. An aqueous solution of the aluminate thus produced, however, is unstable in that a precipitate is formed which is of a varying composition and character.

It could be assumed that a stable sodium aluminate ($NaAlO_2$) would result from the reaction of pure alumina and pure caustic soda or soda ash. This, however, has been found not to be the case, thus lending support to the belief that aqueous solutions of substantially pure sodium aluminate, are necessarily unstable, unless one resorts to the use of a large excess of caustic over that required to form sodium aluminate from alumina or bauxite.

According to our invention it is conveniently and economically feasible to produce sodium aluminate $NaAlO_2$ wherein free caustic is a minimum and indeed is well within the range desired in commercial sodium aluminates and which nevertheless dissolves readily in water to form a solution that is relatively far more stable than present day commercial products.

The principles of the invention are shown graphically in the drawings in which Fig. 1 is a system of curves showing the relationship between the $Al_2O_3$–$Na_2O$ ratio and $SiO_2$ content for a given degree of stability. Fig. 2 is a system of curves showing the relationship between degree of stability and $SiO_2$ content for different alumina caustic ratios.

With high ratios of $Al_2O_3$ to $Na_2O$ (ratios of 1.45 to 1.55 or slightly lower or higher) the inclusion of either an excess of silica (in soluble form) or diminution of the silica below a predetermined value, results in a product which upon solution in water tends to precipitate out within a short period of time.

*Example.*—A solution of approximately 8° Bé. of a sodium aluminate containing the alumina and sodium oxide in the ratio of approximately 1.40 and with approximately 0.03% of $SiO_2$ based on alumina content, produces a precipitate within a period of 15 hours. In contradistinction, sodium aluminate of the same Bé. concentration and $Al_2O_3/Na_2O$ ratio, but containing 0.5% $SiO_2$ based on alumina is found to be quite stable for a period of one month (30 days) or even longer. The substantial further increase of the silica results in a reduction of the stability of the solution. For example—in the presence of 4.6% of $SiO_2$ (based upon alumina present) which is a common proportion in commercial products, there is distinct evidence of precipitation within a period of 5 minutes.

Assuming that stability for a period of 5 hours is sufficient, the range of silica content for the above solution will be within the approximate range of 0.07% to 2.8% of the alumina present.

Assuming an $Al_2O_3$–$Na_2O$ ratio of 1.4 and expressing the $SiO_2$ content as percentage of the total solids, as is done in applicants' original application it is found that .006% $SiO_2$ in sodium aluminate affords a stability of 15 hours in 8° Bé. solutions; 0.5% $SiO_2$ affords a stability of one month or longer, whereas a product containing 2.5% $SiO_2$ is stable for only 5 minutes. The preferred range of $SiO_2$ is from .05% which gives stability for 24 hours, to about 1.5%. A product with 1.0% of $SiO_2$ based upon total solid is stable for two weeks. About 0.5% produces maximum stability in a product having the above $Al_2O_3$–$Na_2O$ ratio.

A concentration of 8° Bé. was selected as suitable for stability determinations because at this strength stabilty of solutions of a given material was at a minimum and less time was required for a test. Other concentrations could have been selected without necessitating changes in the $SiO_2$ content of the dry product.

Various methods may be employed in the preparation of a sodium aluminate compound containing the desired proportions of silica. One method involves the simple addition of sodium silicate (water-glass) to a solution of sodium aluminate. This addition may be effected after the liquid preparation of sodium aluminate, or the water-glass may be added to the bauxite and the caustic or soda-ash employed to make up the sodium aluminate. Such methods, of course, are applicable only in those cases where the proportion of silica in the crude material is otherwise below the desired value. In some cases, it will be apparent that silica present in the raw materials employed to prepare the sodium aluminate may be caused to react with excess caustic, thereby forming the silicate in situ. In case there is an excess of silica present in the raw materials (as in general there will be) the excess is eliminated by the herein described methods, or methods similar thereto. The use of raw materials containing large proportions of silica and which are therefore productive of an excess of silica in the sodium aluminate is under ordinary circumstances the preferable method because the raw materials may be obtained at less expense than products which are more nearly free from silica.

If maximum stability is desired the silica range should be of intermediate value; for example— .5% above given.

A convenient commercial way of preparing a stable sodium aluminate solution suitable for use in accordance with the provisions of this invention, involves the dissolving or fluxing of an ordinary commercial grade of bauxite with caustic soda or soda ash respectively, in the usual manner, whereby a product containing substantial amounts of dissolved silica is generally obtained. Presumably this silica is in the form of sodium silicate. The proportion of silica is then adjusted to bring it within the required range to produce a suitable degree of stability. For some purposes, a period of approximately 5 hours is sufficient. As previously indicated, the amount of silica required for this purpose will depend upon the alkalinity of the sodium aluminate; the higher the caustic value the lower will be the amount of silica required. In general, it is undesirable for economic reasons, to reduce the proportion of silica to a lower value than is absolutely necessary in order to obtain satisfactory stability.

In order to reduce the proportion of silica various methods may be employed. One convenient method involves adding to a hot solution of sodium aluminate, a suitable amount of lime which upon addition tends to form a precipitate of insoluble calcium aluminum silicate, which may readily be separated by settling and decanting the supernatant liquid.

In general, the amount of lime and the time of reaction vary in inverse ratio. Thus to reduce the $SiO_2$ content based upon total solids of sodium aluminate from 2% to .5% by the addition of 5% by weight of hydrated lime based on total solids in solution, to a solution of the aluminate containing 15% $Al_2O_3$, requires 4 hours, the addition of 10% of lime requires 2 hours; the addition of 15% requires approximately 1 hour for the completion of the reaction to the desired silica value at 100° C. Longer periods of reaction in each case reduce the amount of $SiO_2$ further; similarly, more dilute aluminate solutions react with the lime more rapidly.

Hydrate of lime is preferred; however, quick lime, barium hydroxide, and even activated carbon have been found to be capable of removing the silicate.

An example of the application of the principles of our invention follows:

One hundred parts of sodium aluminate containing 2% $SiO_2$ based on solids present is dissolved to form a solution which contains approximately 15% $Al_2O_3$; the solution is agitated for four hours with 5 parts of hydrated lime, while maintaining a temperature of approximately 100° C. The resulting solution is then separated from the insoluble matter by filtration of decantation. By doubling the amount of lime the time of reaction is halved. The clear solution thus obtained is evaporated and a solid product having approximately .5% $SiO_2$ is thereby produced. Percentage of silica is here based upon total solids present.

The inter-relationship of the silica content and the $Al_2O_3$–$Na_2O$ ratio, in the production of stable sodium aluminate solutions may be illustrated in the following manner:

Appropriate amounts of sodium hydroxide as a 50% water solution, silicate of soda, and the hydrate of alumina, were reacted to form the sodium aluminate composition. The mass was boiled down and granulated with stirring. The granulated product was dried for one-half hour at 400° C. after which it was ground and portions thereof dissolved in water to make standard 8° Bé. solutions for the stability tests. It was found that as the $SiO_2$ was increased, the granulation became more difficult so that above 3.0% $SiO_2$ on $Al_2O_3$ the product was not granulated but the clear strong liquor diluted to 8° Bé. It was also found that as the $Al_2O_3$/$Na_2O$ ratio was increased the dried solid became more crystalline and hard. This undoubtedly was due to the smaller amount of excess NaOH present. The stability of the solution was reported as the time required for the appearance of the first indication of an aluminum hydrate precipitate. It should be observed that a slight flock of iron and organic matter recognizable by characteristic color, or by conventional chemical tests, was initially formed, but this flock was disregarded. The results of tests conducted upon 8° Bé. solutions having ratios of $Al_2O_3$ to $Na_2O_3$ of 1.40, 1.50, 1.55 and 1.60 to 1 are tabulated in the appended tables.

| Ratio $Al_2O_3$/$Na_2O$ | Stability at 8° Bé. in hours | | | |
|---|---|---|---|---|
| | 1.40 | 1.50 | 1.55 | 1.60 |
| $SiO_2$ as percentage of total $Al_2O_3$: | | | | |
| .03 | 15 hours | .38 hours | .13 hours | .03 hours |
| .07 | 23 hours | | | |
| .08 | | .50 hours | | .05 hours |
| .11 | 2½ days | | | |
| .13 | | .75 hours | .22 hours | .05 hours |
| .26 | 16 days | | | |
| .58 | | 6.5 | 2.0 | .13 |
| .80 | | 22 | 5.5 | |
| 1.13 | | 144 | 18 | .33 |
| 2.24 | | 12 | 20 | 1.5 |
| 2.80 | | 3.5 | 3.5 | 5 |
| 3.35 | | 1.5 | 1.25 | 1.75 |
| 4.5 | | .33 | .30 | .33 |
| 5.6 | | .17 | .15 | .15 |

| $SiO_2$ as percentage of total $Al_2O_3$ | Stability at 8° Bé. |
|---|---|
| .31 | Over 1 month. |
| .43 | Do. |
| .75 | Do. |
| .95 | Do. |
| 1.40 | Do. |
| 1.84 | Do. |
| 2.79 | 2 hours. |
| 3.70 | 15 mins. |
| 4.62 | 5 mins. |
| 9.22 | 2 mins. |

The method of obtaining the desired ratios of $Al_2O_3$ to $Na_2O$ is simple. For example, it may be effected by increasing or decreasing the proportion of soda or caustic used in the initial reaction. Caustic may also be added to preformed sodium aluminate, in case the latter contains too high a proportion of alumina.

Although the proportion of silica to alumina ($Al_2O_3$) at least in the cases where low proportions of $Al_2O_3$ to $Na_2O$ are present may vary over a considerable range without inducing undue instability of the product, there is, in every case, an approximate value of $SiO_2$ at which stability seems to be a maximum. Approximately optimum proportions of silica for given $Al_2O_3$/$Na_2O$ ratios are tabulated as follows:

| Ratio | $SiO_2$ as percentage of $Al_2O_3$ | Period of stability |
|---|---|---|
| 1.40 | .5–1.0 | Indefinitely. |
| 1.50 | 1.2 | 144 hours (estimated). |
| 1.55 | 1.5 | 100 hours (estimated). |
| 1.60 | 2.8 | 5 hours. |

Figure 1 illustrates graphically the interdependence of the silica content and caustic relationship with respect to stability. In this graph the ratio of $Al_2O_3$ to $Na_2O$ is plotted as ordinates. The area contained within lines EP—PF is representative of sodium aluminate wherein the percentage of silica is such as will afford at least 5 hours stability of aqueous 8° Bé. solution. Line E—P, represents minimum proportions of silica required to give the desired degree of stability. Line F—P, represents the maximum proportion of silica that still will give a corresponding degree of stability. Values of silica within these two curves will give products of higher stability than represented by the two bounding curves. Line O—P, indicates approximate percentages of silica required to give maximum stability at any $Al_2O_3$/$Na_2O$ ratio. The optimum amount of silica will in many cases result in products which are stable for an almost indefinite period of time. Such high stability, while desirable, is not essential for many commercial uses. Proportions of silica required to give approximately 24 hour stability are embraced within curves A—B and C—D. The line demarking 24 hour stability rises above the 1.55 horizontal line, and parallels the general contour of E—P.

The relationship between period of stability and percentage of $SiO_2$ based upon $Al_2O_3$ content for sodium aluminate solutions of 8° Bé. and various $Al_2O_3$/$Na_2O$ ratios is shown in Fig. 2 of the drawings. In this figure time in hours of stability are plotted as ordinates. For purposes of conserving space, the scale of ordinates varies logarithmically. The percentage of $SiO_2$ is plotted as abscissa. Separate curves for $Al_2O_3$/$Na_2O$ ratios of 1.40, 1.50, 1.55 and 1.60 are included.

To assist in locating the points corresponding to the test readings for different percentages of silica as recorded in the above tables, light guide lines have been drawn intermediate the main ordinate lines. The readings indicated thereon were experimentally determined and are correct within the limits of experimental error.

The process of stabilizing sodium aluminate set forth herein is highly desirable from a commercial viewpoint, because the expense of the raw materials is slight, the equipment required is simple and the manipulation involved does not require skilled technical supervision. The product is of high stability when dissolved in water which is a result which has never been obtained heretofore to the best of our knowledge. By employing the invention it is quite possible to obtain sodium aluminate solutions which are stable for many hours or even days or weeks, and which would otherwise produce precipitation in a few minutes or at best within a few hours.

Although only the preferred forms of the invention have been shown and described, it will be apparent to those skilled in the art that various modifications may be made therein without departure from the spirit of the invention or the scope of the appended claims.

What we claim is:

1. An article of manufacture—sodium aluminate having an $Al_2O_3/Na_2O$ weight ratio of substantially 1.4, an aqueous solution of which is relatively stable and further characterized in that it contains substantially .5% $SiO_2$ based on total solids.

2. The method of producing sodium aluminate, an aqueous solution of which is relatively stable, from a commercial grade of sodium aluminate having an $Al_2O_3/Na_2O$ weight ratio of substantially 1.4, the $SiO_2$ content, based on total solids, of which is in excess of 1.5% which comprises reducing the $SiO_2$ content to substantially .5% by precipitating the same from an aqueous solution of the aluminate by means of lime and in the absence of carbonates and finally evaporating the solution and recovering solid sodium aluminate.

3. The method of storing aqueous solutions of sodium aluminate while avoiding the formation of a precipitate in the aluminate solution, characterized in that the $SiO_2$ content of the solution, having an $Al_2O_3/Na_2O$ weight ratio of substantially 1.4, is adjusted to substantially .5% of the solids present.

4. A method of preparing solid, dry sodium aluminate which is stable in aqueous solution and which has an $Al_2O_3/Na_2O$ ratio of not substantially less than 1.4 and not substantially more than 1.6, which comprises adjusting the $SiO_2$ content of an aqueous solution of sodium aluminate to between .05 and 1.5% of $SiO_2$ based on the total solids present, the final $SiO_2$ content being dependent upon, and a direct function of, said $Al_2O_3/Na_2O$ ratio.

5. A method of preparing solid, dry sodium aluminate which is stable in aqueous solution and which has an $Al_2O_3/Na_2O$ ratio of not substantially less than 1.4 and not substantially more than 1.6, which comprises adjusting the $SiO_2$ content of an aqueous solution of sodium aluminate to between .05 and 1.5%, based on the total solid present and evaporating the aqueous solution to dryness, the final $SiO_2$ content being dependent upon, and a direct function of, said $Al_2O_3/Na_2O$ ratio.

6. A method of preparing sodium aluminate which is stable in aqueous solution and which has an $Al_2O_3/Na_2O$ ratio of not substantially less than 1.4 and not substantially more than 1.6, which comprises adjusting the $SiO_2$ content of an aqueous solution of sodium aluminate to between .05 and 1.5% of $SiO_2$ based on total solids present, the final $SiO_2$ content being dependent upon, and a direct function of, said $Al_2O_3/Na_2O$ ratio.

7. An article of manufacture comprising solid, dry sodium aluminate, having an $Al_2O_3/Na_2O$ ratio of not substantially less than 1.4 and not substantially more than 1.6, which is stable in 8° Bé. aqueous solution for at least 24 hours and contains from .05 to 1.5% $SiO_2$ on a total solids bases, the final $SiO_2$ content being dependent upon, and a direct function of, said $Al_2O_3/Na_2O$ ratio.

8. A method of preparing solid, dry sodium aluminate which is stable in aqueous solution and which has an $Al_2O_3/Na_2O$ ratio of not substantially less than 1.4 and not substantially more than 1.6, which comprises first determining said ratio and then adjusting the $SiO_2$ content of an aqueous solution to between 0.05 and 1.5% of $SiO_2$ by removing or adding $SiO_2$, according to the original $SiO_2$ content and said ratio, the final $SiO_2$ content being dependent upon, and a direct function of, said $Al_2O_3/Na_2O$ ratio.

9. Solid sodium aluminate which is completely soluble in water and whose 8° Bé. aqueous solution is stable for not substantially less than twenty-four hours, said product being further characterized in that the $Al_2O_3/Na_2O$ ratio is not substantially less than 1.40 and not substantially more than 1.60 and containing $SiO_2$ in water soluble form, for $Al_2O_3/Na_2O$ ratios of 1.40, 1.50, 1.55 and 1.60 the percent of silica based on $Al_2O_3/Na_2O$ content being 0.7, 1.2, 1.5 and 2.8 respectively, the silica content for other intermediate ratios being as shown on the curve OP in Fig. 1 of the drawings.

10. Solid sodium aluminate which is completely soluble in water and whose 8° Bé. aqueous solution is stable for not substantially less than twenty-four hours, said product being further characterized in that the $Al_2O_3/Na_2O$ ratio is not substantially less than 1.40 and not substantially more than 1.55 and containing $SiO_2$ in water soluble form, the $SiO_2$ content at 1.55 ratio being between 1.20 and 2.20 percent, the $SiO_2$ content at 1.50 ratio being between 0.80 and 2.10 percent and the $SiO_2$ content at 1.40 ratio being between 0.05 and 2.30 percent, the $SiO_2$ content for other intermediate ratios being determined by the lines AB and CD in Fig. 1 of the drawings.

11. Solid sodium aluminate which is completely soluble in water and whose 8° Bé. aqueous solution is stable for not less than twenty-four hours, said product being further characterized in that the $Al_2O_3/Na_2O$ ratio is not substantially less than 1.50 and not substantially more than 1.55 and containing $SiO_2$ in water soluble form, the $SiO_2$ content at 1.55 ratio being between 1.20 and 2.20 percent and the $SiO_2$ content at 1.50 ratio being between 0.80 and 2.10 percent, the $SiO_2$ content for other intermediate ratios being determined by the lines AB and CD in Fig. 1 of the drawings.

WILLIAM S. WILSON.
ALBAN J. LOBDELL, Jr.